(12) United States Patent
Chavez Sandoval et al.

(10) Patent No.: US 12,728,380 B2
(45) Date of Patent: Sep. 8, 2026

(54) ADSORBENT RETENTION PLATE ASSEMBLY FOR AN EVAPORATIVE EMISSIONS CANISTER

(71) Applicant: PHINIA Jersey Holdings LLC, Wilmington, DE (US)

(72) Inventors: Cesar Cain Chavez Sandoval, Ciudad Juarez (MX); Jose Mauricio Alonso, Ciudad Juarez (MX)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 321 days.

(21) Appl. No.: 18/405,138

(22) Filed: Jan. 5, 2024

(65) Prior Publication Data

US 2025/0222390 A1 Jul. 10, 2025

(51) Int. Cl.
*B01D 53/02* (2006.01)
*B01D 53/04* (2006.01)
*F02M 25/08* (2006.01)

(52) U.S. Cl.
CPC ..... *B01D 53/0415* (2013.01); *F02M 25/0854* (2013.01); *B01D 2257/708* (2013.01); *B01D 2259/4516* (2013.01)

(58) Field of Classification Search
CPC ...... B01D 2257/708; B01D 2259/4516; B01D 53/0415; F02M 25/0854
See application file for complete search history.

(56) References Cited

U.S. PATENT DOCUMENTS 4,877,001 A * 10/1989 Kenealy ............ F02M 25/0854 123/519
5,098,453 A * 3/1992 Turner .............. F02M 25/0854 55/509
6,551,388 B1 4/2003 Oemcke et al.
(Continued)

FOREIGN PATENT DOCUMENTS

EP 0512597 A1 11/1992
EP 0355976 B1 12/1992
(Continued)

OTHER PUBLICATIONS

International Search Report of the International Searching Authority for Application No. PCT/US2024/060988, dated Apr. 1, 2025 (2 pages).

*Primary Examiner* — Christopher P Jones
(74) *Attorney, Agent, or Firm* — WARNER NORCROSS + JUDD LLP

(57) ABSTRACT

A retention plate assembly and an evaporative emissions canister including the retention plate assembly are provided. The assembly includes a cover for closing an open end of the canister. The cover has an inner surface. A retention plate has a first surface facing the cover and an opposite second surface facing away from cover. The first surface of the retention plate is spaced from the inner surface of the cover. A plurality of pins extend from the inner surface of the cover. A plurality of bosses extend from the first surface of the retention plate. The number of bosses equal the number of pins such that each boss complements one of the pins. The pins are aligned with and received in the bosses, and travel of the retention plate is guided by the pins. The pins and bosses cooperatively limit tilting of the retention plate.

14 Claims, 9 Drawing Sheets

(56) References Cited

U.S. PATENT DOCUMENTS

| | | | |
|---|---|---|---|
| 7,409,946 | B2 | 8/2008 | King |
| 9,759,167 | B2 | 9/2017 | Catton et al. |
| 2007/0199547 | A1 | 8/2007 | Shears et al. |
| 2010/0313763 | A1 | 12/2010 | Lang et al. |
| 2011/0247592 | A1 | 10/2011 | Kim et al. |
| 2023/0151781 | A1 | 5/2023 | Iwamoto |

FOREIGN PATENT DOCUMENTS

| | | | |
|---|---|---|---|
| EP | 2740526 | A1 | 6/2014 |
| KR | 20040017053 | A | 2/2004 |

* cited by examiner

ADSORBENT RETENTION PLATE ASSEMBLY FOR AN EVAPORATIVE EMISSIONS CANISTER

FIELD OF THE INVENTION

The disclosure generally relates to evaporative emissions canisters for adsorption of fuel vapors in fuel powered automotive vehicles and, more specifically, to a retention plate assembly for an evaporative emissions canister.

BACKGROUND OF THE INVENTION

Evaporative loss of fuel vapor generated within fuel tanks of the fuel systems of motor vehicles powered by internal combustion engines is a potential contributor to atmospheric air pollution by hydrocarbons. Canister systems that employ activated carbon to adsorb the fuel vapor emitted from the fuel systems are used to limit such evaporative emissions from the fuel tanks of gasoline-fueled automotive vehicles. A typical evaporative emissions canister includes a casing inside of which a gas passage is formed and filled with activated carbon as a fuel vapor adsorbent. Charge and purge ports for fuel vapor are communicated with one end of the gas passage, while an atmospheric port (vent port) is communicated with the other end of the gas passage, thus allowing for charging of the canister. During stoppage of the vehicle (e.g., when parked), fuel vapor generated from the fuel in the fuel tank is introduced through the charge port into the canister and adsorbed by the adsorbent. During operation of the engine, atmospheric air is introduced through the atmospheric vent port to purge the fuel vapor in the canister by desorbing fuel vapor that was adsorbed in the adsorbent. The flow of air carries the purged fuel vapor to an intake system of the engine through the purge port so that the fuel vapor can be combusted within the engine, thus accomplishing a purging of the canister. By the desorption of fuel vapor during purging, the carbon adsorbent is regenerated and a fuel vapor adsorbing performance of the canister is revived, thereby allowing the adsorbent to repeatedly adsorb fuel vapor during periods of non-use of the engine.

The adsorbent such as activated carbon is typically contained within one or more chambers formed in the internal volume of the canister. The chamber in which the adsorbent is filled may be separated from a void space (empty chamber) in the internal volume of the canister by a partition such as a layer of foam and/or a perforated plate. Conventionally, a coil spring is disposed between the partition and a wall of the canister (such as the canister cover) to absorb/compensate for variations in the amount of adsorbent filled in the chamber by providing a biasing force against the partition in the direction of the filled chamber. The biasing force against the partition also prevents adsorbent from entering the empty chamber that is adjacent to the filled chamber. However, vibrational forces acting on the canister, as well as failure of the spring to maintain the partition in place, cause the partition to tilt, which allows the adsorbent to pass by the edge(s) of the partition and undesirably seep into the empty chamber. Therefore, a need exists for an improved device that limits or eliminates tilting of the partition and prevents a loss of integrity of the adsorbent packing and subsequently adsorbent from passing the partition into the empty chamber.

BRIEF SUMMARY

An improved retention plate assembly for an evaporative emissions canister and an evaporative emissions canister including the retention plate assembly are provided. The retention plate assembly includes a cover for closing an open end of the canister. The cover has an inner surface. The assembly further includes a retention plate having a first surface facing the cover and an opposite second surface facing away from cover. The first surface of the retention plate is spaced from the inner surface of the cover. The assembly further includes a resilient member between the retention plate and the cover and engaged with the first surface of the retention plate and the inner surface of the cover. A plurality of pins extend from the inner surface of the cover. A plurality of bosses extend from the first surface of the retention plate. The number of bosses equal the number of pins such that each said boss complements one of the pins. The pins are aligned with and received in the bosses, and travel of the retention plate is guided by the pins and the pins and bosses cooperatively limit tilting of the retention plate.

In specific embodiments, the bosses are evenly spaced about the first surface of the retention plate, and the pins are evenly spaced about the inner surface of the cover.

In specific embodiments, each of the pins has a cross-shaped cross-section.

In specific embodiments, each of the pins has a terminal end distal from the inner surface of the cover. The terminal end includes a stop.

In specific embodiments, each boss includes a recess sized to receive one of the pins. Each boss further includes at least one inwardly curved, flexible finger that is engageable with the stop. The at least one finger extends into the recess, and the stop limits an amount of travel of the retention plate away from the cover.

In specific embodiments, each boss is a generally tubular projection including a cylindrical recess.

In specific embodiments, the assembly includes four of said pins and a complementary four of said bosses.

In particular embodiments, the four pins are disposed at four vertices of a quadrilateral shape, and the four bosses are disposed at four vertices of the quadrilateral shape.

In specific embodiments, the assembly includes at least one metal bead on the first surface of the retention plate for detecting the position of the retention plate within the housing.

The evaporative emissions canister includes a casing defining an internal volume. A retention plate partitions the internal volume into an adsorbent chamber and a void space. An adsorbent fills the adsorbent chamber. A cover closes an opening in the casing. The cover is adjacent the void space and has an inner surface that faces the void space and the retention plate. The retention plate has a first surface facing the cover and a second surface facing the adsorbent chamber. A resilient member is between the retention plate and the cover and is engaged with the first surface of the retention plate and the inner surface of the cover. A plurality of pins extend from the inner surface of the cover. A plurality of bosses extend from the first surface of the retention plate. The number of bosses equals the number of pins such that each boss complements one of the pins. The pins are aligned with and received in the bosses. Travel of the retention plate is guided by the pins and the pins and bosses cooperatively limit tilting of the retention plate. Urged engagement of the retention plate with the adsorbent in the adsorbent chamber maintains the packing of the adsorbent in the adsorbent chamber.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A retention plate assembly for an evaporative emissions (e.g., fuel vapor) canister is provided. Referring to FIGS. 1-9, wherein like numerals indicate corresponding parts throughout the several views, the evaporative emissions canister is illustrated and generally designated as a fuel vapor storage canister 10 for a fuel tank of a vehicle fuel system that pumps liquid fuel, by way of non-limiting example gasoline fuel, from the fuel tank (not shown) to an internal combustion engine (not shown) that powers an automotive vehicle. The fuel vapor storage canister 10 traps fuel vapors that arise in the fuel tank during periods of non-use of the internal combustion engine due to, for example, daily variations in ambient temperatures or during refilling of the fuel tank. The fuel vapor storage canister 10 exhibits a reduction in excessive tilt of an adsorbent retention plate and thus an improvement in pack integrity of adsorbent that fills the adsorbent chamber(s).

Figure 1:
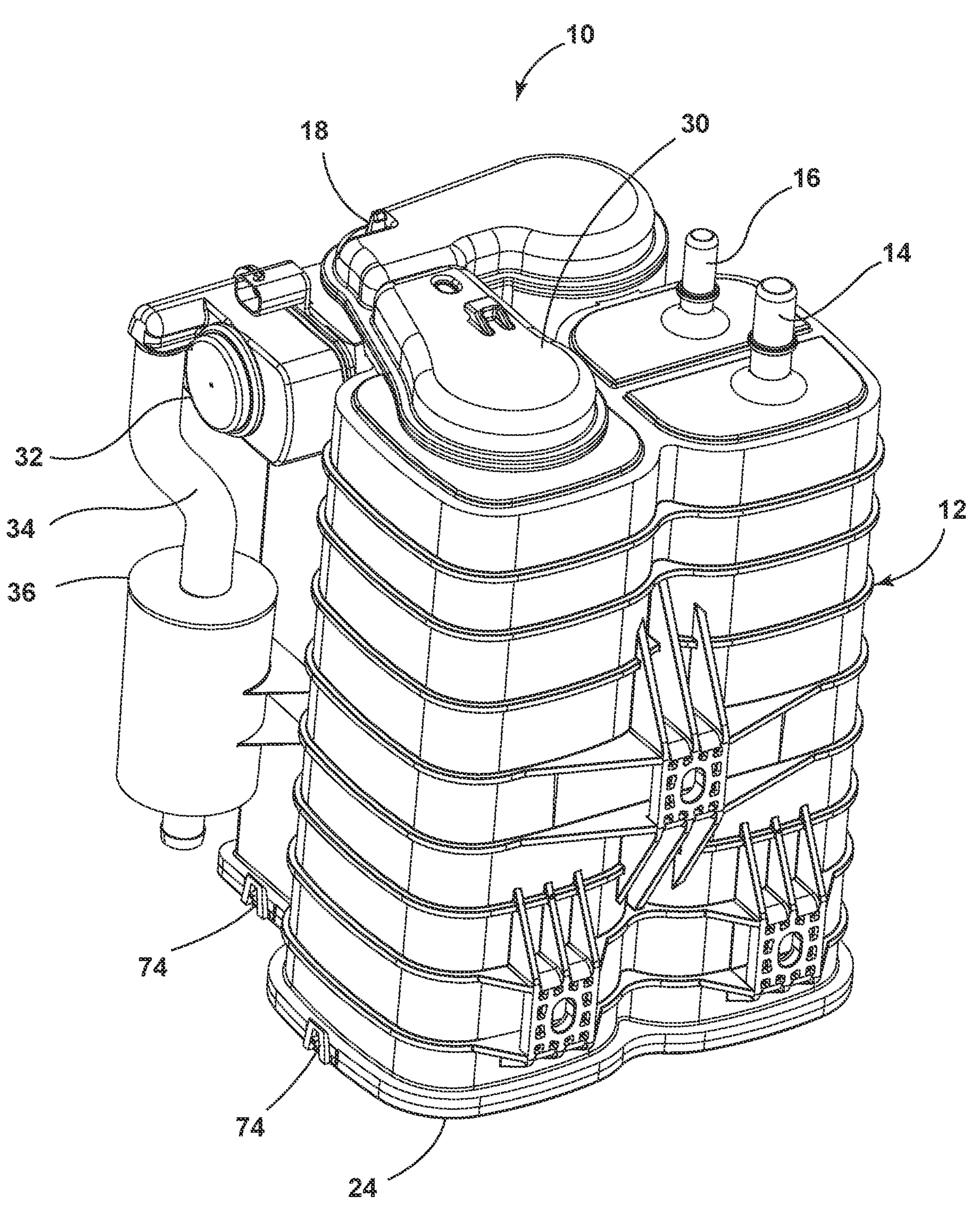
FIG. 1 is a perspective view of an evaporative emissions canister in accordance with embodiments of the disclosure, as viewed from above.
Figure 2:
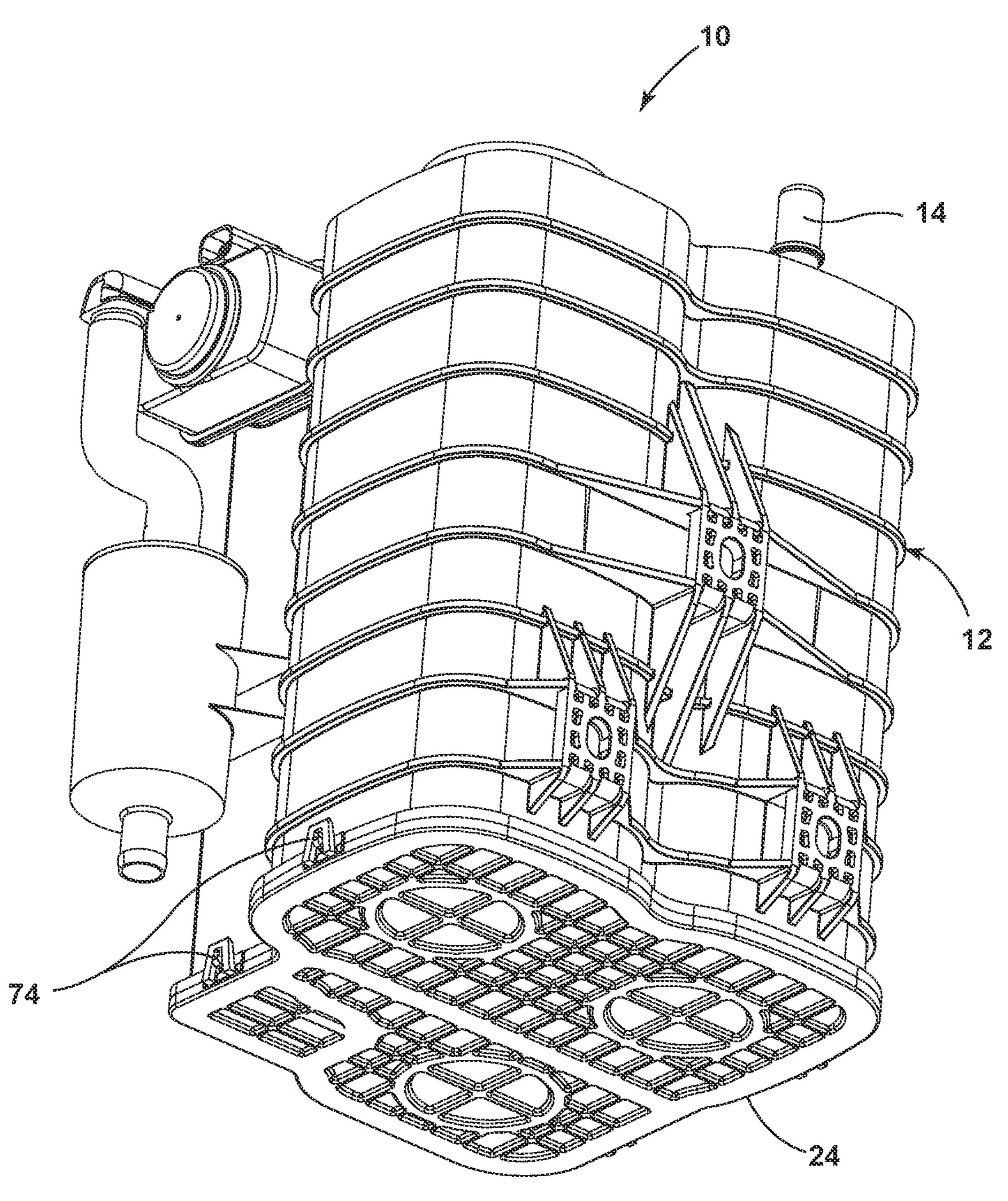
FIG. 2 is a perspective view of the evaporative emissions canister, as viewed from below.

FIGS. 1 and 2 generally depicts a fuel vapor canister 10 used in a vehicle fuel system. The fuel vapor canister 10 includes a casing (housing) 12 that forms a main body of the canister 10. The housing 12 defines an internal volume within the main body. The internal volume may be one single chamber inside the canister, or as shown may be partitioned into a plurality of chambers. The housing 12 may be by formed by molding and may be substantially impermeable. The housing 12 has at least one inlet and outlet in fluid communication with the internal volume of the housing 12. Particularly, the housing 12 has a charge port 14, a purge port 16, and a vent port 18. The charge port 14 and purge port 16 are disposed at one end of the internal volume of the housing 12, while the vent port 18 is disposed at an opposite end of a flow path through the internal volume, so that there may be fluid flow between the charge port 14 and the vent port 18 or between the vent port 18 and the purge port 16. The charge port 14 is connected to and in fluid communication with the vehicle fuel tank (not shown), while the vent port 18 is open to the atmosphere for venting the canister 10 and for admission of purge air. The purge port 16 is connected to and in fluid communication with an air intake system of the engine (not shown) via a conduit or similar. During non-use of the internal combustion engine when the engine is off, fuel vapors generated in the fuel tank travel through the charge port 14 and into the internal volume of the housing 12. The fuel vapors become trapped in the housing 12, and air exits the housing 12 through the vent port 18. During periods of use of the internal combustion engine when the engine is running, air is drawn into the canister 10 through the vent port 18, and the trapped fuel vapors are expelled from the housing 12 through the purge port 16 and into the air intake system of the internal combustion engine. It is therefore apparent that the charge port 14 is an inlet and the purge port 16 is an outlet, while the vent port 18 may be an outlet or an inlet depending on the operation of the canister 10 (charging versus purging) and the associated direction of flow.

Figure 3:
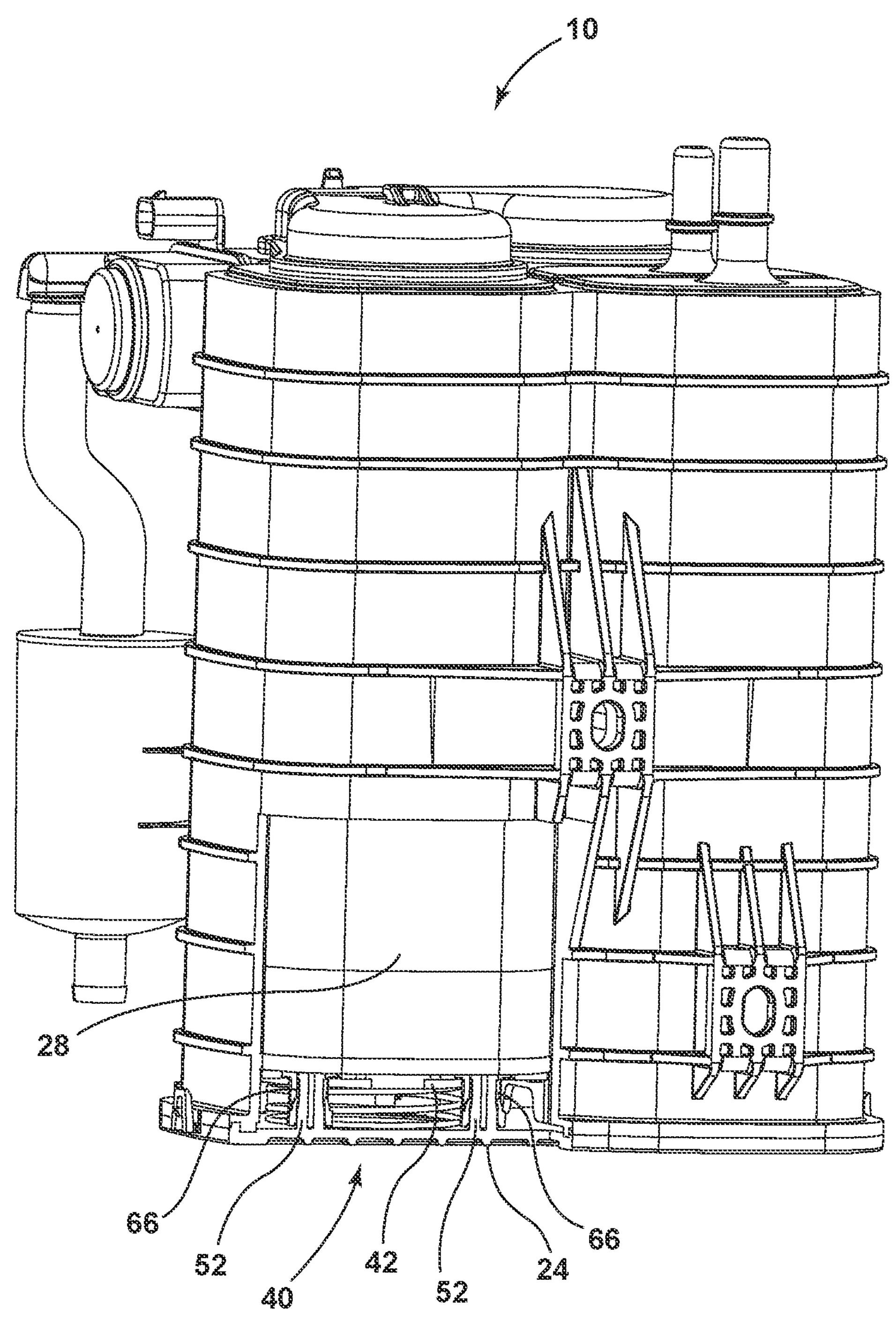
FIG. 3 is a perspective view of the evaporative emissions canister, with a portion of the canister partially cut away to reveal a retention plate assembly in accordance with embodiments of the disclosure.
Figure 4:
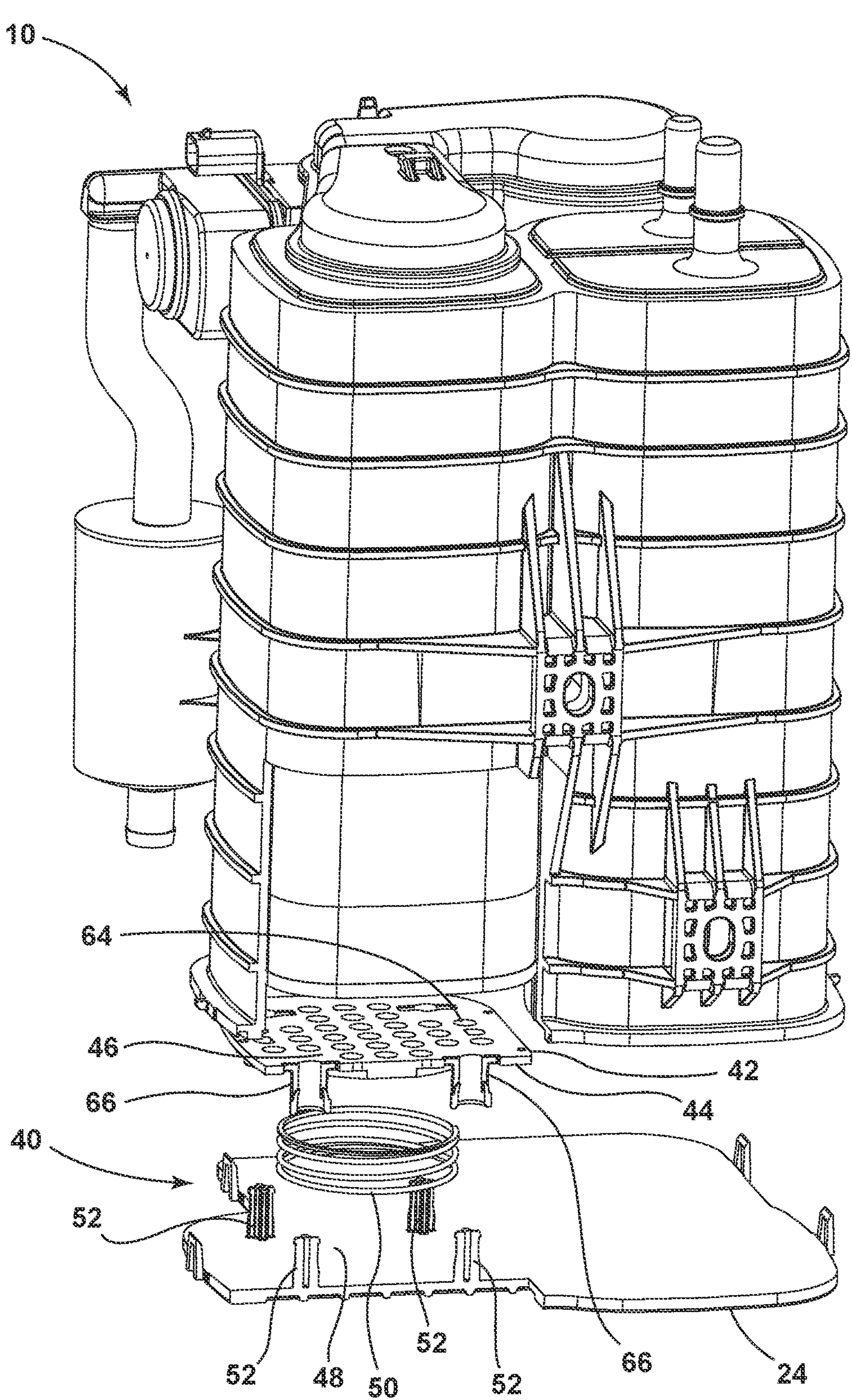
FIG. 4 is an exploded view of the evaporative emissions canister of FIG. 3.
Figure 5:
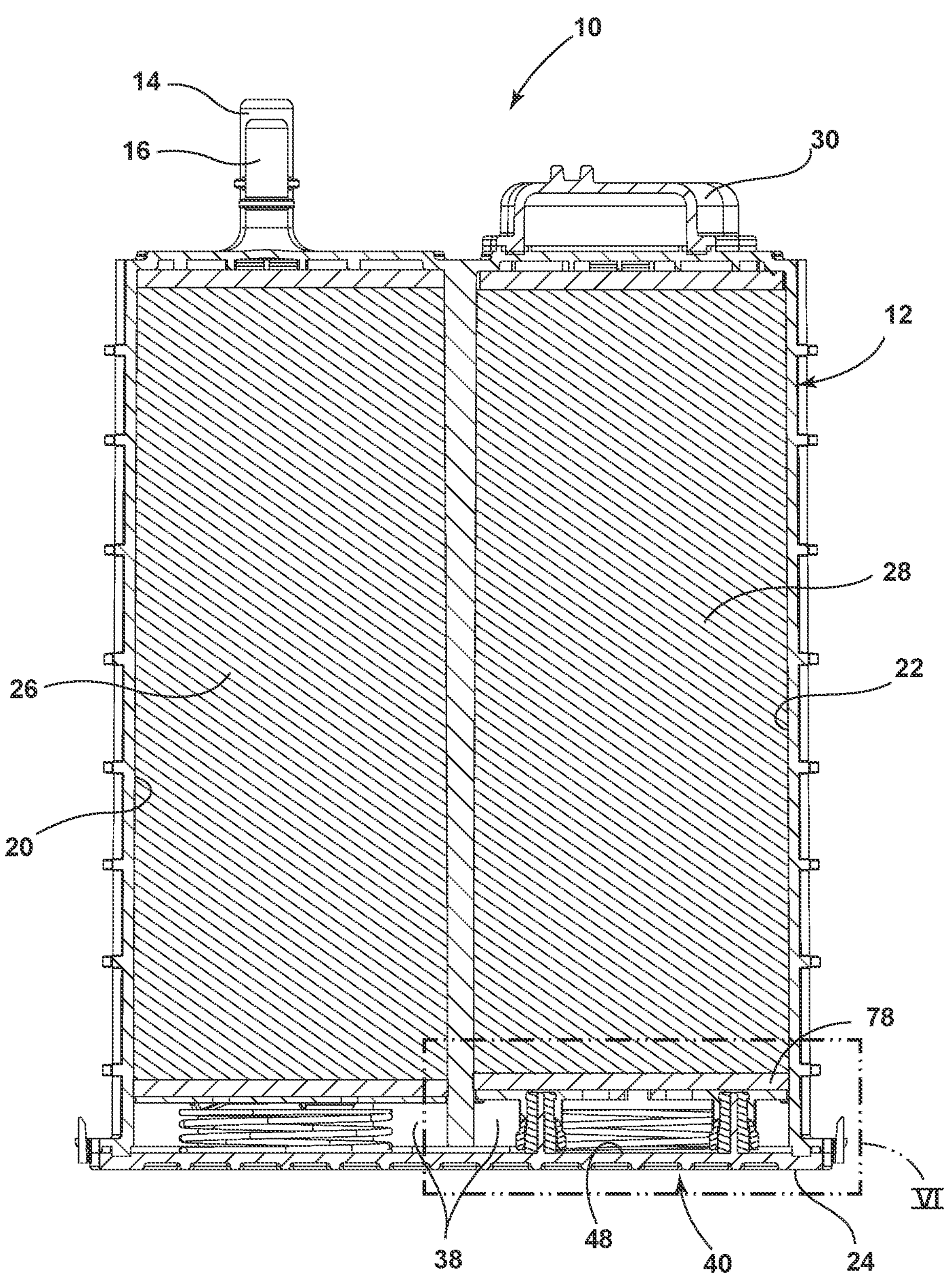
FIG. 5 is a cross-sectional view of the evaporative emissions canister of FIG. 3.
Figure 6:
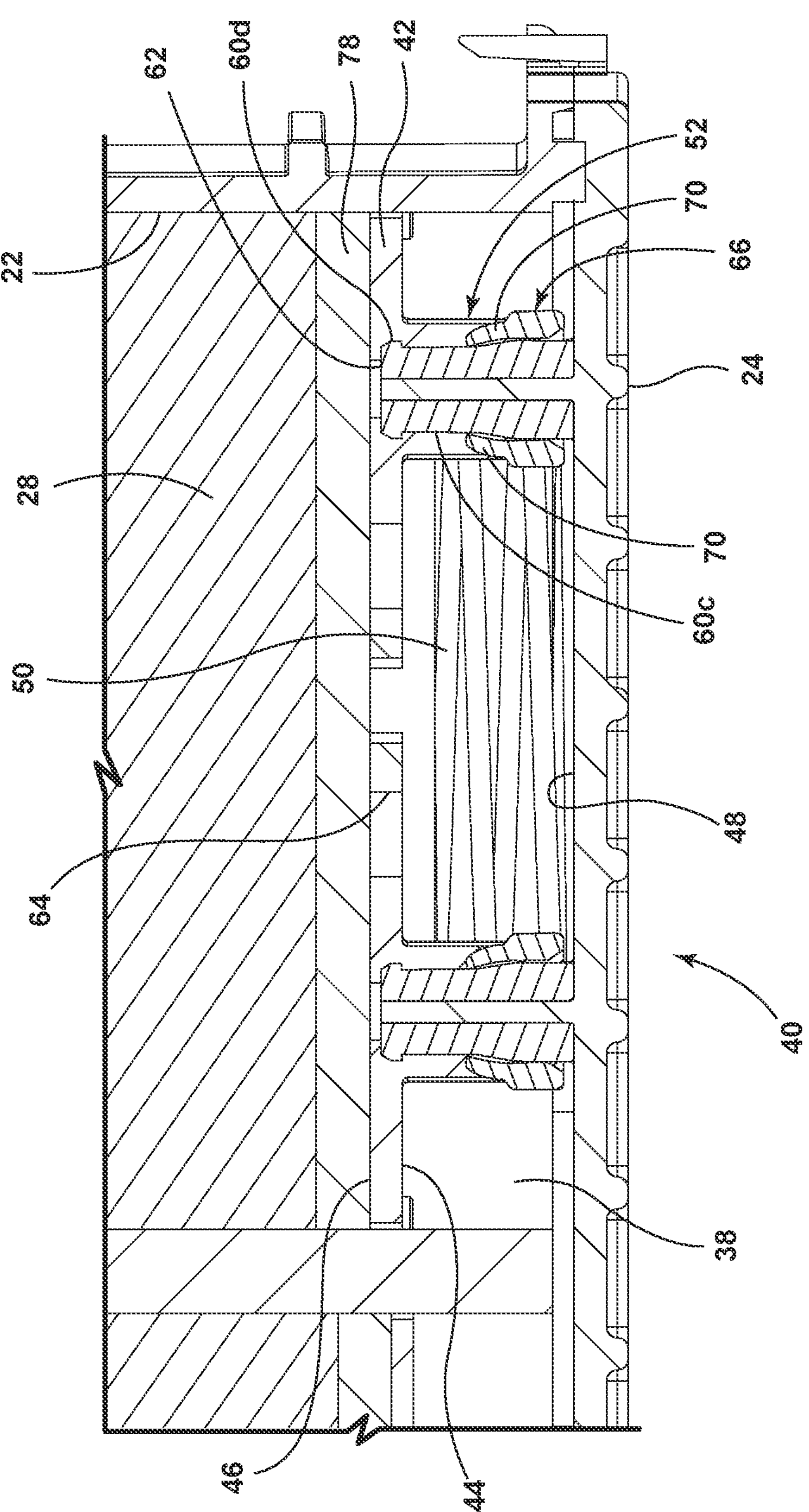
FIG. 6 is an enlarged cross-sectional view of a portion VI of FIG. 5.
Figure 7:
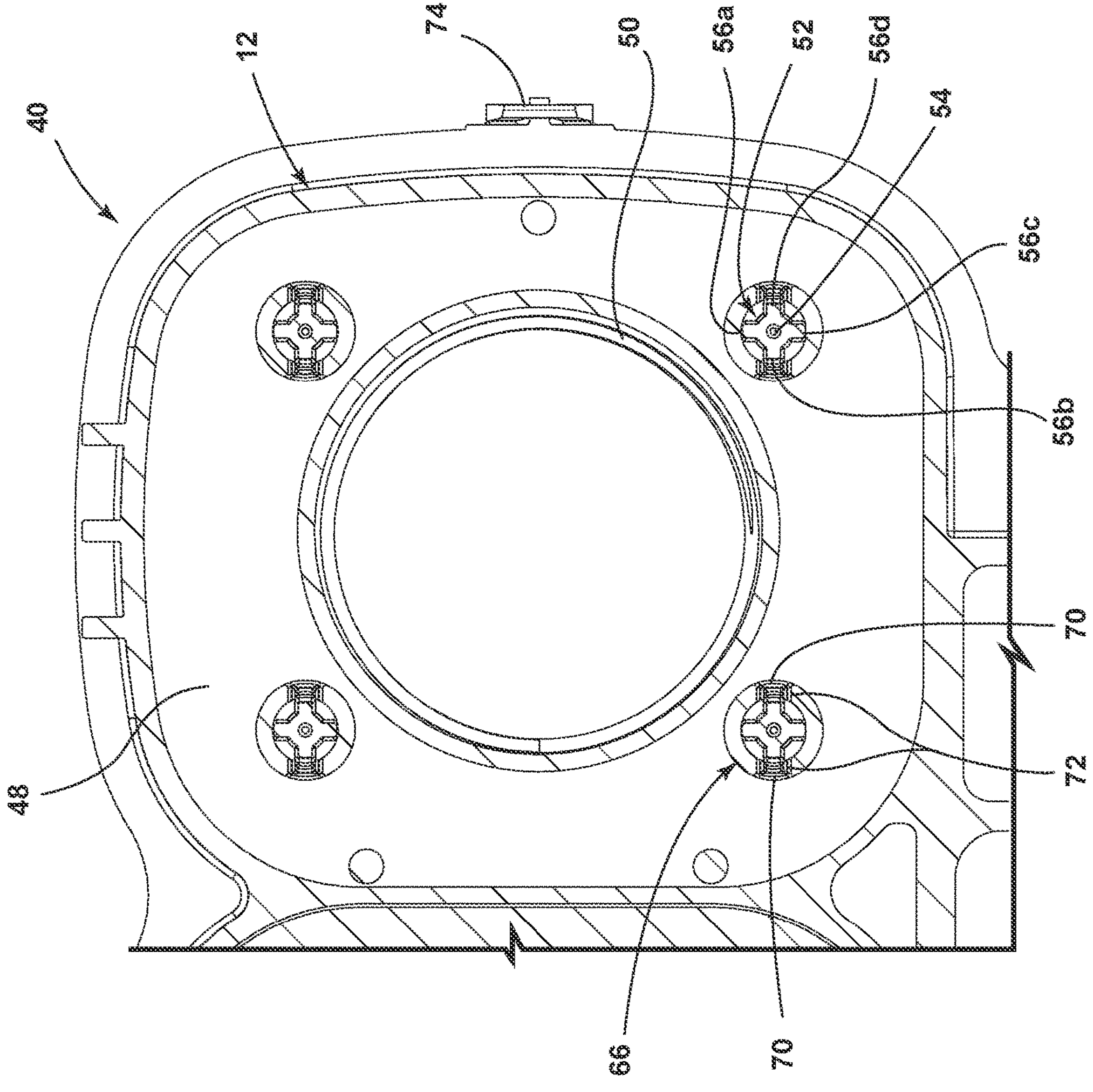
FIG. 7 is a plan, cross-sectional view of a portion of the evaporative emissions canister of FIG. 3.
Figure 8:
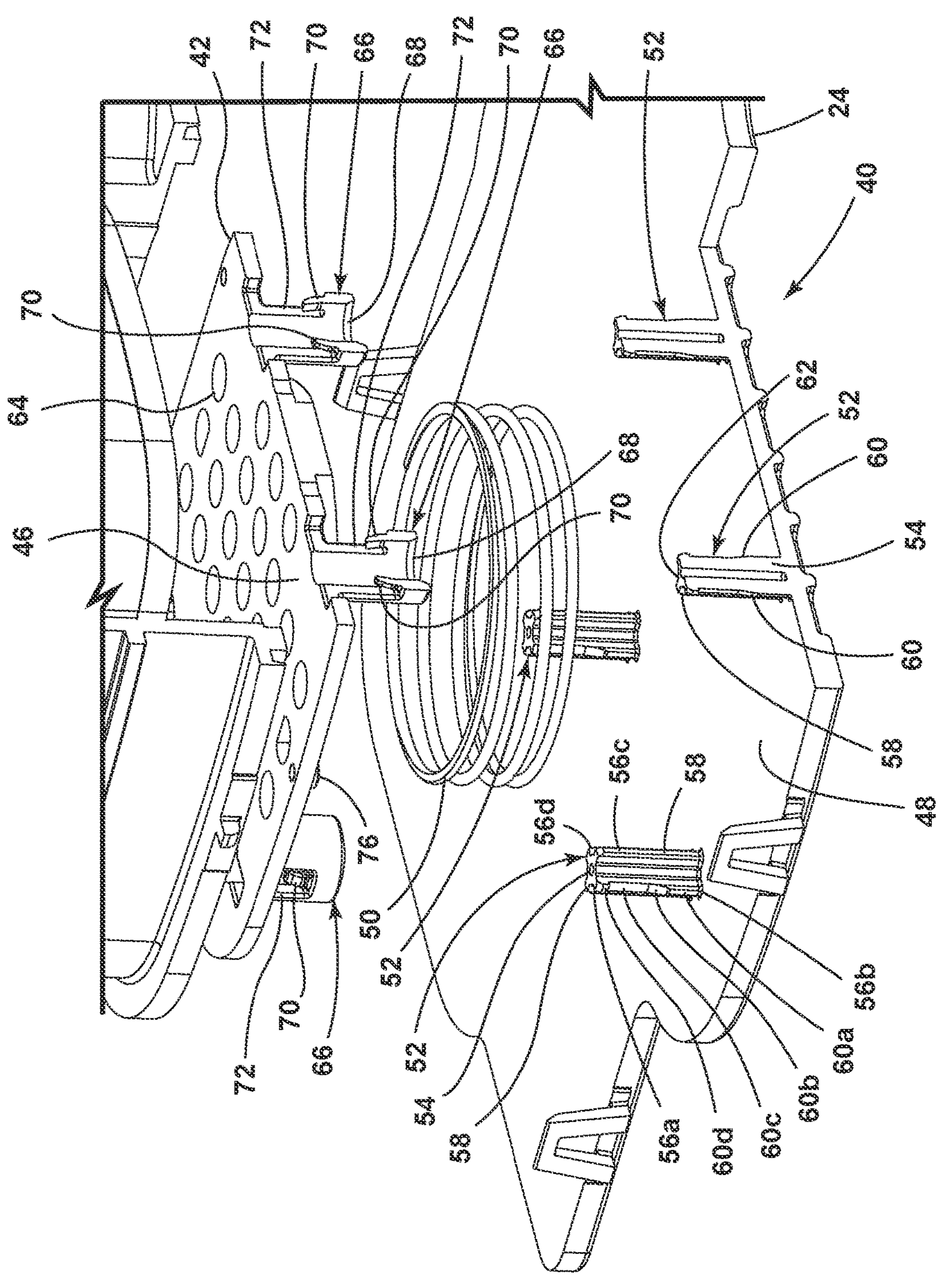
FIG. 8 is an enlarged exploded view of a portion of the evaporative emissions canister of FIG. 4, as view from above.
Figure 9:
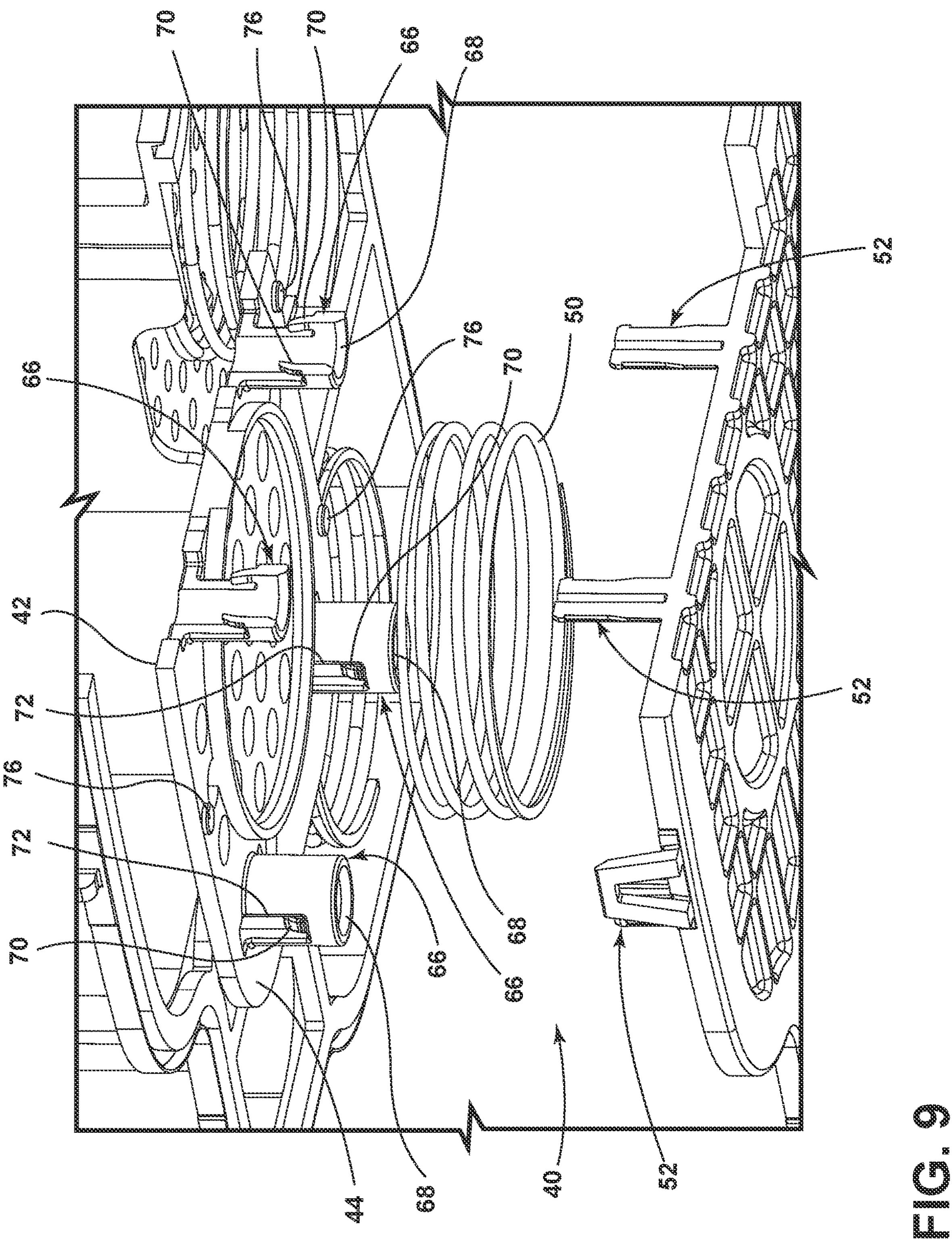
FIG. 9 is an enlarged exploded view of a portion of the evaporative emissions canister of FIG. 4, as view from below.

With continued reference to FIGS. 1 and 2 and additional reference to FIGS. 3-5, in the embodiment shown the internal volume of the housing 10 is divided into and includes a plurality of chambers including at least a first chamber 20 and a second chamber 22. A bottom cover 24 is releasably connectable to the housing 12 and closes the open end of the housing 10 and hence closes the chambers when connected to the housing. The first chamber 20 is fluidly connected to the charge port 14 and purge port 16. The first chamber 20 contains a predetermined quantity of a first adsorbent material 26 such as but not limited to a hydrocarbon adsorption material that is an activated carbon material, and or be any other suitable adsorbent material known in the art that adsorbs hydrocarbon molecules onto the surface of the material. Suitable adsorption materials include but are not limited to pelletized carbon particles, granular carbon particles, structured media of an extruded, wound, folded, pleated, corrugated, bonded, or poured form, sheets, foams, and the like. The second chamber 22 is fluidly connected to the first chamber 20 and contains a predetermined quantity of a second adsorbent material 28. The second adsorbent material 28 may also be an activated carbon material, but is not limited to activated carbon, and may or may not be the same as the first adsorbent material 26 and further may be any suitable adsorption material as described above. A third chamber is fluidly connected to the second chamber 22 via a port 30 and is also fluidly connected to the vent port 18 via a fluid pump 32, a conduit 34, and a filter 36. The third chamber contains a predetermined quantity of a third adsorbent material (not shown) which may also be an activated carbon material, but is not limited to activated carbon, and may or may not be the same as the first adsorbent material 26 and/or the second adsorbent material 28 and further may be any suitable adsorption material as described above.

A flow path for air and fuel vapors through the canister 10 during charging of the canister (non-use of the engine) comprises flow through the charge port 14 to the first adsorbent material 26 in the first chamber 20, then through a void space 38 (between the cover 24 and the chambers 26, 28) and into the second chamber 22, then through the second adsorbent material 28 into the port 30, then through the third adsorbent material in the third chamber. In reverse, during purging of the canister 10, a flow path for air and fuel vapors comprises flow through the vent port 18 to the third adsorbent material in the third chamber, then through the port 30 and into the second adsorbent material 28 in the second chamber 20, then through the void space 38 and into the first adsorbent material 26 in the first chamber 20 and ultimately to the purge port 16.

With reference now to FIGS. 3-9, the canister 10 includes a retention plate assembly 40 generally disposed in the void space 38 between the second chamber 22. As described in more detail below, the retention plate assembly 40 reduces tilt and thereby maintains the integrity of packing of the adsorbent fill. The assembly 40 includes a retention plate 42 having a first (outwardly-facing) surface 44 facing the cover 24 and an opposite second (inwardly-facing) surface 46 facing away from the cover and towards the second chamber 22 and second adsorbent material 28. The retention plate partitions a portion of the internal volume of the housing 12 into the second chamber 22 and the void space 38. The assembly 40 further includes the cover 24, which is adjacent the void space 38 and has an inner surface 48 that faces the void space 38 as well as the first surface 44 of the retention plate 42. A resilient member 50 such as a coil spring or similar is disposed between the retention plate 42 and cover 24, and is engaged with the retention plate first surface 44 and the cover inner surface 48.

A plurality of pins 52 extend from the inner surface 48 of the cover 24. In the embodiment shown in the drawings, the assembly 40 includes four pins. It is noted that in the partial cutaway views of FIGS. 4, 8, and 9, the "front" two pins 52 are cut into section, whereas the "back" two pins 52 are complete/whole. The four pins are evenly and/or symmetrically spaced from each other and in the exemplary embodiment are at the four vertices (corners) of a quadrilateral shape such as a square or rectangle. The pins 52 are generally linear, vertical projections that extend perpendicular to the cover inner surface 48. In the embodiment shown in the drawings, each pin 52 has a cross-shaped or cross-like-shaped cross-section, i.e. a plus sign-shaped or plus sign-like cross-section in a horizontal direction (perpendicular to the projecting direction of the pins and parallel to the cover inner surface). As such, each pin has a central body 54 and four flanges 56*a-d* projecting outwardly in a lateral direction from side surface(s) of the body 54. The body is essentially a post (e.g., cylindrical post, square-shaped post, or the like) at the center of the pin 52. In some embodiments, the body 54 is hollow for added strength. The flanges 56*a-d* generally extend along the entire vertical length of the body 54. Adjacent, neighboring flanges are generally at right angles to each other such that the flanges are evenly spaced around the body 54, and each flange is generally 180 degrees opposite one other flange. Two of the opposite flanges 56*a*,56*c* have a generally flat, smooth outer surface 58, while the other two opposite flanges 56*b*,56*d* have a contoured outer surface 60. Particularly, and for which purpose will become more clear below, the contoured outer surface 60 includes a base portion 60*a* adjacent the cover inner surface 48, followed by a ramp portion 60*b*, a recessed portion 60*c*, and finally a stop portion (stop) 60*d* at a terminal end 62 of the pin 52 that is distal from the cover inner surface 48. The stop portion 60*d* is in the form of a tab that extends further in the lateral direction from the body 54 of the pin 52 than the recessed portion 60*c*, and the stop portion 60*d* also may extend laterally from the body 54 approximately than same length as the base portion 60*a*. The ramp portion 60*b* is an inclined surface that is angled inwardly from the base portion 60*a* to the recessed portion 60*c*.

The retention plate 42 has a shape and dimensions that are dependent upon the cross-sectional shape of the chamber in which the retention plate is disposed, and should correspond to this cross-sectional shape so that the entirety of the outer edge of the retention plate meets the wall of the chamber/internal volume in which the retention plate is disposed. The retention plate 42 as shown therefore has a generally square, rectangle, or other quadrilateral shape with round corners. The retention plate 42 has a plurality of through holes 64 extending from the first surface 44 to the second surface 46 to allow fluid (i.e., gaseous substances such as air and fuel vapor) to pass through the retention plate. Of more significance to the assembly 40, the retention plate 42 includes a plurality of bosses 66 extending from the first surface 44. The number of bosses 66 is equal to the number of pins 52. Therefore, in the exemplary embodiment the assembly 40 includes four bosses 66. Each boss 66 complements a specific one of the pins 52 such that each boss is paired with one of the pins. It is noted that in the partial cutaway views of FIGS. 4, 8, and 9, the "front" two bosses 66 are cut into section, whereas the "back" two bosses 66 are complete/whole. The four bosses 66 are evenly and/or symmetrically spaced from each other and in the exemplary embodiment are at the four vertices (corners) of a quadrilateral shape such as a square or rectangle. Each boss 66 includes a recess 68 sized to receive one of the pins 52. As shown by example, each boss 66 is a generally tubular projection that projects outwardly and generally perpendicular to the retention plate first surface 44. As such, the recess 68 is the hollow portion within the tubular projection and has a generally cylindrical shape. The diameter/width of the recess is sized based on the largest width between two opposite flanges 56 of the pins 52, so the pins 52 can be received within the recesses 68 of the bosses 66, i.e. the diameter/width of the recess is at least as large as the largest width between opposite flanges. Stated differently, the width between two opposite flanges of the pins is sized to be no larger than the diameter/width of the recesses so that the pins fit into their complementary recesses in the bosses. Each boss 66 further includes at least one cantilevered finger 70. Each finger is flexible and is inwardly curved or projects at least slightly inward into the recess 68. Since the finger(s) 70 cooperate with the contoured surfaces 60 of the flanges 56 of the pins 52, the number of fingers for each boss is equal to the number of flanges of each pin that have contoured surfaces. As such, in the exemplary embodiment each boss 66 includes two fingers 70, and these two fingers are opposite each other 180 degrees radially around the circumference of the boss. In the exemplary embodiment, each boss 66 includes two slots 72 that extend in a vertical/axial direction from the retention plate first surface 44 to an axial position that is proximate the outer end of the boss (near the opening to the recess 68). For example, the slots 72 may extend approximately two-thirds to three-quarters of the axial length of the boss 66. The base of each finger 70 is at an outer end (in the axial direction) of each respective slot 72, and each finger 70 extends from the base towards the retention plate first surface 44 and inwardly towards the recess 68.

Each pin 52 is generally identical in size and shape as the other pins 52. Likewise, each boss 66 is generally identical in size and shape as the other bosses 66. However, all the pins may not have the same size or shape, and/or all the bosses may not have the same size or shape. Thus, there may be variance in size between pin and boss pairs so long as the pin and boss of each pair are complementary in size. Likewise, there may be variance in shape between pin and boss pairs so long as the pin and boss of each pair are complementary in shape. By complementary in size and shape, it is generally meant that the pin may fit into and smoothly travel within the recess of its paired boss. Further, the arrangement of the bosses 66 on the retention plate first surface 44 is partially dependent upon the geometry of the retention plate so that the bosses are generally evenly spaced around the plate in a balanced manner. Thus, for example, if the retention plate were to have a triangular shape, the retention plate may include three bosses disposed at vertices of a triangle.

The pins 52 of the cover 24 are aligned with and received into the recesses 68 of the bosses 66. Particularly, to assemble the retention plate assembly, the cover 24 is aligned with the canister 10 such that the pins 52 on the cover 24 are aligned with the bosses 66 on the retention plate 42. This can also be accomplished by aligning the cover 24 about the open end of the canister so that the locking/snapping features 74 on the cover and canister are aligned. As the cover 24 is installed on the canister 10 by engaging the locking/snapping features 74, the pins 52 are received into the recesses 68 in the bosses 66. As each pin 52 moves into the recess 68, the stop portion 60*d* pushes the fingers 70 slightly outward to allow the stop portion 60*d* to pass the fingers 70. The fingers then return to a resting position in which the fingers are within the recessed portion 60*c* and the tips of the fingers may contact the recessed portion 60*c*. In this configuration, the tips of the fingers are inward relative to the stop portions 60*d*, and the pins 42 cannot be removed from the recesses 68 without pulling the fingers outwardly. Once the cover 24 is secured on the canister 10, the resilient member 50 urges the retention plate 42 in an inward direction towards the adsorbent material 28. As the retention plate 42 moves, the pins 52 guide the travel of the retention plate and prevent or limit the retention plate tilting away from a horizontal position in which the retention plate is generally parallel to the cover. Or stated differently, the retention plate 42 is maintained in a plane that is perpendicular to the direction of travel. The retention plate is thereby urged into engagement with the adsorbent material 28, and the guide and support provided by the pins 52 prevents the retention plate from tilting, which maintains the integrity of the packing of the adsorbent material 28 in the chamber 22 and prevents adsorbent from passing by the retention plate and into the void space 38. Further, the distance of inward travel of the retention plate 42 in the direction of the adsorbent material 28 is limited by the stop portions 60*d* of the pins 52. Particularly, as the retention plate 42 moves away from the cover 24, the fingers 70 slide along the recessed portions 60*c* of the pins 52. However, at a certain point in this movement, the fingers 70 will come in contact with the stop portions 60*d*, and due to the inward bend of the fingers 70, the fingers cannot pass the stop portions and further movement of the retention plate 42 in this direction is prevented.

In some embodiments, the retention plate 42 may further include one or more bumps 76 in the form of beads of metal material on the first surface 44 of the retention plate 42. The bumps 76 aide in determining the position of the retention plate 42 within the internal volume of the casing 12.

A partition such as a screen 78 may be disposed at the end of the chamber 22 adjacent to retention plate 42 and between the retention plate and the adsorbent material 28. The screen 78 may be a foam material or other suitable porous material that is permeable to air and vapors but impermeable to the adsorbent material 28. The screen thus prevents the adsorbent material 28 from passing through the through holes 64 in the retention plate 42, but allows air, vapors, and other gases to freely pass between the adsorbent and the retention plate.

While the retention plate assembly 40 is shown in connection with the second chamber 22 only and the first chamber 20 and third chamber simply include a spring, it should be understood that a retention plate assembly as described herein may be included in connection with the first chamber 20 or the third chamber, and may be included for each of the chambers of the canister 10. The retention plate assembly 40 is shown only with the second chamber 22 by way of example only.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members.

Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A retention plate assembly for an evaporative emissions canister, the assembly comprising:

a cover for closing an open end of the canister, the cover having an inner surface;

a retention plate having a first surface facing the cover and an opposite second surface facing away from cover, the first surface of the retention plate being spaced from the inner surface of the cover;

a resilient member between the retention plate and the cover and engaged with the first surface of the retention plate and the inner surface of the cover;

a plurality of pins extending from the inner surface of the cover, each pin having a central body and at least one flange extending vertically along the length of the body, wherein the at least one flange has an outer surface that includes a terminal end that is distal from the inner surface of the cover, the terminal end including a stop; and a plurality of bosses extending from the first surface of the retention plate, the number of bosses equaling the number of pins such that each said boss complements one of the pins, each boss including a recess sized to receive one of the pins, each boss further including at least one cantilevered, inwardly curved, flexible finger that is engageable with the stop, each finger extending into the recess;

the pins being aligned with and received in the bosses, wherein travel of the retention plate is guided by the pins, the pins and bosses cooperatively limit tilting of the retention plate, and the stops of the pins limit an amount of travel of the retention plate away from the cover by contacting the fingers of the bosses.

2. The retention plate assembly of claim 1, wherein the bosses are evenly spaced about the first surface of the retention plate, and the pins are evenly spaced about the inner surface of the cover.

3. The retention plate assembly of claim 1, wherein each of the pins has a cross- shaped cross-section.

4. The retention plate assembly of claim 1, wherein each boss is a generally tubular projection including a cylindrical recess.

5. The retention plate assembly of claim 1, including four of said pins and a complementary four of said bosses.

6. The retention plate assembly of claim 5, wherein the four pins are disposed at four vertices of a quadrilateral shape, and the four bosses are disposed at four vertices of the quadrilateral shape.

7. The retention plate assembly of claim 1, including at least one metal bead on the first surface of the retention plate for detecting the position of the retention plate within the housing.

8. An evaporative emissions canister comprising:

a casing defining an internal volume;

a retention plate partitioning the internal volume into an adsorbent chamber and a void space;

an adsorbent that fills the adsorbent chamber;

a cover closing an opening in the casing, the cover being adjacent the void space and having an inner surface that faces the void space and the retention plate;

the retention plate having a first surface facing the cover and a second surface facing the adsorbent chamber;

a resilient member between the retention plate and the cover and engaged with the first surface of the retention plate and the inner surface of the cover;

a plurality of pins extending from the inner surface of the cover, each pin having a central body and at least one flange extending vertically along the length of the body, wherein the at least one flange has an outer surface that includes a terminal end that is distal from the inner surface of the cover, the terminal end including a stop; and a plurality of bosses extending from the first surface of the retention plate, the number of bosses equaling the number of pins such that each said boss complements one of the pins, each boss including a recess sized to receive one of the pins, each boss further including at least one cantilevered, inwardly curved, flexible finger that is engageable with the stop, each finger extending into the recess;

the pins being aligned with and received in the bosses, wherein travel of the retention plate is guided by the pins, the pins and bosses cooperatively limit tilting of the retention plate, the stops of the pins limit an amount of travel of the retention plate away from the cover by contacting the fingers of the bosses, and urged engagement of the retention plate with the adsorbent in the adsorbent chamber maintains the packing of the adsorbent in the adsorbent chamber.

9. The evaporative emissions canister of claim 8, wherein the bosses are evenly spaced about the first surface of the retention plate, and the pins are evenly spaced about the inner surface of the cover.

10. The evaporative emissions canister of claim 8, wherein each of the pins has a cross-shaped cross-section.

11. The evaporative emissions canister of claim 8, wherein each boss is a generally tubular projection including a cylindrical recess.

12. The evaporative emissions canister of claim 8, including four of said pins and a complementary four of said bosses.

13. The evaporative emissions canister of claim 12, wherein the four pins are disposed at four vertices of a quadrilateral shape, and the four bosses are disposed at four vertices of the quadrilateral shape.

14. The evaporative emissions canister of claim 8, including at least one metal bead on the first surface of the retention plate for detecting the position of the retention plate within the housing.

* * * * *